L. D. MILLS.
PROCESS OF RECOVERING VALUABLE SOLUTION FROM MIXTURES.
APPLICATION FILED MAR. 10, 1919.
1,385,701.
Patented July 26, 1921.
2 SHEETS—SHEET 2.
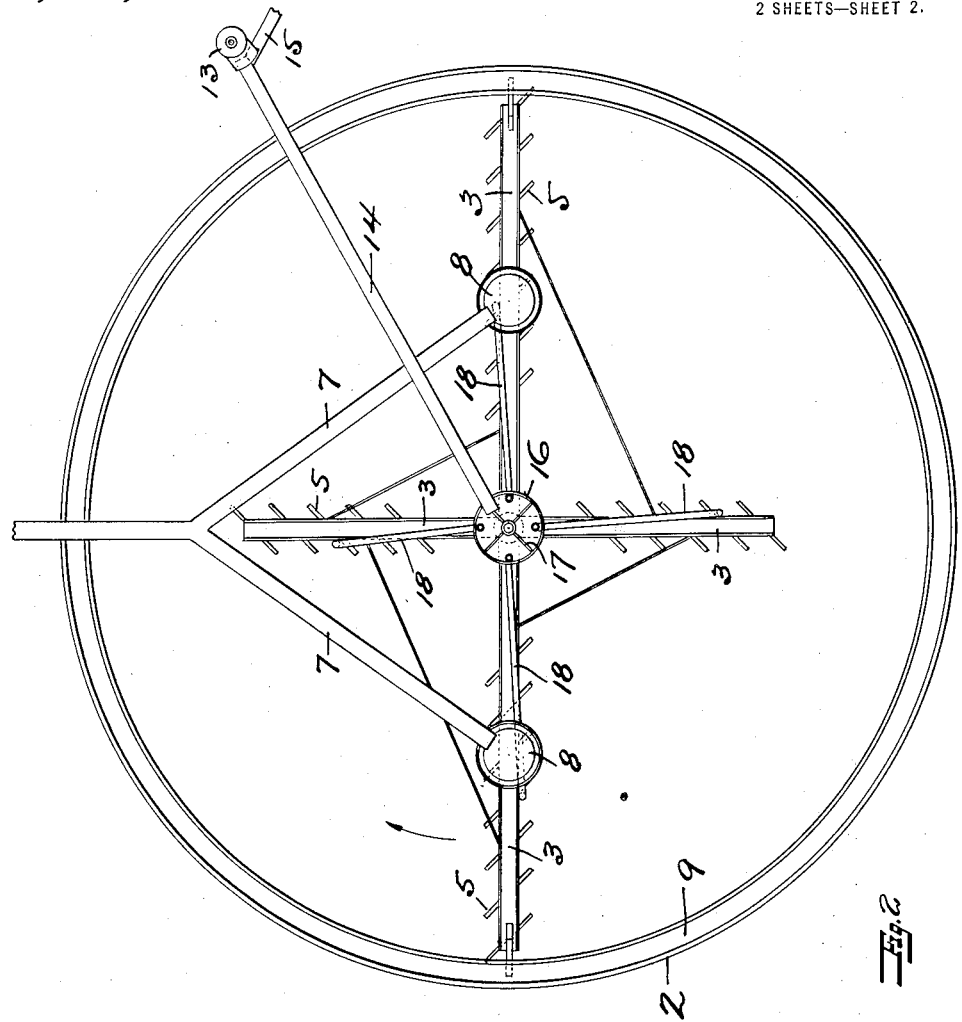
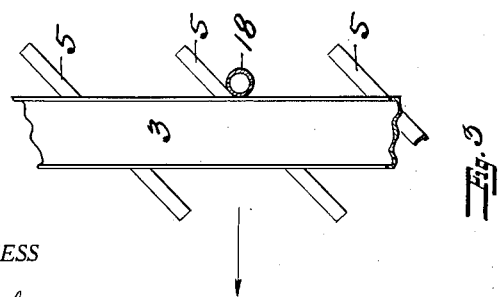
WITNESS
J. B. Gardner
INVENTOR
Louis D. Mills
BY
White &Pint
HIS ATTORNEYS

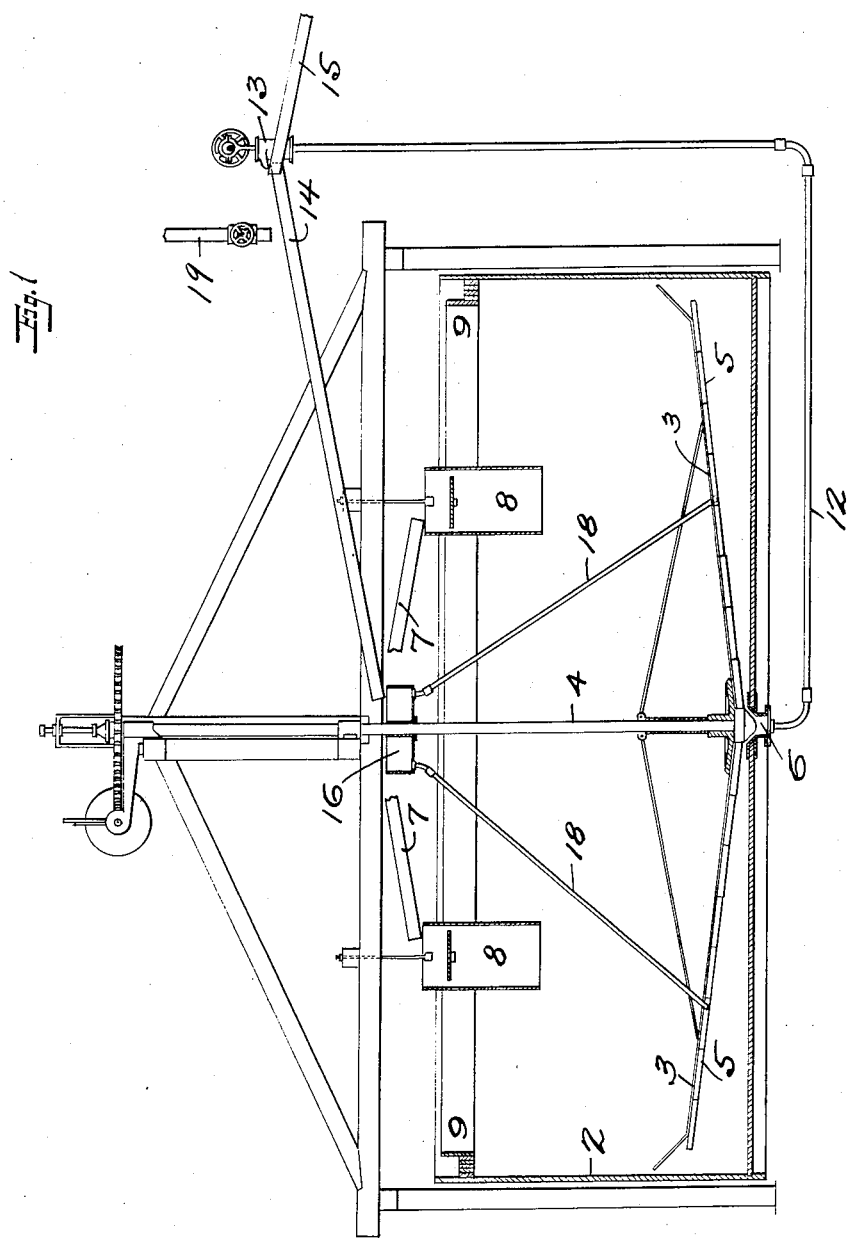

UNITED STATES PATENT OFFICE.

LOUIS D. MILLS, OF REDWOOD CITY, CALIFORNIA.

PROCESS OF RECOVERING VALUABLE SOLUTION FROM MIXTURES.

1,385,701.   Specification of Letters Patent.   Patented July 26, 1921.

Application filed March 10, 1919. Serial No. 281,616.

*To all whom it may concern:*

Be it known that I, LOUIS D. MILLS, a citizen of the United States, and a resident of Redwood City, San Mateo county, State of California, have invented a certain new and useful Process of Recovering Valuable Solution from Mixtures, of which the following is a specification.

The invention relates to a process for replacing valuable solution in a mixture of solution and solids or semi-solids, with water or other liquid and relates particularly, but not exclusively, to methods of applying the wash or dilution solutions commonly used in the counter-current decantation system of separating liquids from solids.

An object of the invention is to provide a process for recovering practically all of the dissolved values from a mixture of finely ground solids and solution without filtration.

Another object of the invention is to provide a process for recovering practically all of the dissolved values from such mixtures without unduly increasing the stock of solution in the system.

The invention possesses other advantageous features, some of which, with the foregoing, will be set forth at length in the following description, where I shall outline in full the process of my invention and that form of the apparatus which I have selected for illustration in the drawings accompanying and forming part of the present specification. In said drawings I have shown two forms of the apparatus of my invention, but it is to be understood that I do not limit myself to such forms, since the invention as set forth in the claims, may be embodied in other forms.

Referring to said drawings:

Figure 1 is a vertical section through one form of apparatus of my invention; a standard Dorr thickener forming part thereof.

Fig. 2 is a plan view of the apparatus shown in Fig. 1.

Fig. 3 is a detail of one of the thickener arms.

In customary practice, the wash solutions used in these thickeners are added to the pulp flowing to the loading well or feed sump at the center of the tank. Obviously when this is done, the proportions of original solution and wash solution will be the same both in the overflow of the tank and in the solution in the discharge, the dilution of fractionating being theoretically proportional to the relative volumes of the feed solution and wash solution. By the use of my invention, a greater portion of the feed solution is recoverable in the thickener overflow and a correspondingly greater volume of the wash solution is contained in the thickener discharge.

In applying my invention to the cyanid process of extracting valuable metal from its ore, I flow the pulp, consisting of a mixture of finely divided ore and pregnant cyanid solution into a tank or vessel in which the pulp stratifies, so that at the bottom of the tank there occurs a layer of thick pulp, above which is a layer of thin pulp, and above this, a layer of clear pregnant solution which it is desired to recover. As the pulp continues to flow into the tank, settlement continues and the clear solution overflows from the tank to be further treated as desired. The settled solids are moved by plows or other means toward the discharge outlet of the tank, through which they discharge as a thick pulp.

This thick pulp necessarily carries valuable solution as moisture and it is one of the objects of this invention to replace this solution as completely as possible with a wash solution so that the amount of valuable solution discharged with the solids is minimized. This is accomplished by introducing a suitable washing mixture or liquid into the layer of thick pulp, preferably at its lower portion, to displace the salution carried by the thick pulp. The washing solution, which may be a mixture of solids and water or solids and barren cyanid solution, or either liquid alone is flowed gently into the layer of thick pulp without materially disturbing or agitating the layer and is preferably introduced at or adjacent the point at which the settled pulp is being turned over by the moving plows. The washing mixture may be of substantially the same specific gravity as the thick pulp, so that channeling, which may be caused by difference in specific gravity does not result. The object of this is to keep the solution of the washing mixture in the lower layer of thick pulp, so that it will not ascend and dilute the supernatant solution. When washing mixtures of less specific gravity are used, they tend to form channels and to rise rapidly and irregularly through the layers of pulp, causing an incomplete displacement of the valuable solution in the pulp and further causing a dilution of the wash solution with the valuable solution which was already separated. I have discovered that when the gravity of the wash solution is substantially the same as the gravity of the pulp or mixture to be separated, and when the two mixtures are brought properly in contact, then channeling is prevented and a substantially complete replacement is obtained; that is, most of the wash solution passes out with the solids in the thickener discharge and the valuable solution is recovered in the thickener overflow.

To cause a more complete replacement of the valuable solution with the washing mixture or liquid, the washing mixture or liquid is introduced into the thick pulp, at or adjacent the point at which the settled pulp is being turned over by the moving plows. During the time that the settled pulp is being turned over it is in such condition that the washing liquid will readily replace the valuable solution. The apparatus, in which the process is carried out, is constructed so that the bulk of the solids settle in the zone which is served by the washing liquid pipes, thereby causing efficient replacement of the valuable solution and further preventing channeling in the thick pulp.

When the washing mixture employed is of substantially the same specific gravity as the thick pulp, then the thick pulp, in which the valuable solution has been replaced, is discharged from the tank continuously at a greater rate than fresh pulp is fed into the tank. A portion of the discharged pulp is withdrawn from the circuit, and the remainder is mixed with washing solution and flowed back into the layer of thick pulp in the tank, whence after diffusion and settlement it is again discharged. When liquid alone is employed as the replacing element the thick pulp discharged may not be returned to the tank.

The apparatus as shown comprises a thickener of the Dorr type, comprising a tank 2 having rotatable arms 3 arranged therein and supported on the rotatable vertical shaft 4. Secured to the arms and arranged at an angle thereto are a plurality of plows 5, for turning over and moving the settled material toward the central discharge outlet 6. The fresh pulp is flowed through the launders 7 into the loading wells 8 disposed intermediate the shaft 4 and the side of the tank, so that the bulk of the solids in the pulp settle more or less uniformly in the annular zone between the shaft and the wall of the tank. The feed of the pulp is continuous and the solids settle, forming layers of thick pulp, then pulp and clear solution. The tank is provided with an overflow launder 9 for the clear solution.

The settled solids are moved by the plows to the central discharge outlet 6 whence they are drawn in the form of a thick pulp, through the pipe 12 by the pump 13, preferably a diaphragm pump. Arranged below the discharge spout of the pump are two launders 14—15, the launder 14 receiving the greater proportion of the pulp lifted, for example 80% and the launder 15 receiving about 20% which is the equivalent in solids of the original fresh pulp feed, which amount is removed from the circuit. A pipe 19 discharges water or barren solution into the launder 14 in substantially the same amount as the liquid content of the pulp that is removed from the circuit, and the mixture thus produced comprises the washing mixture. From the launder 14, the diluted thick pulp flows into the hopper 16 supported on the shaft 4 and disposed above the edge of the overflow launder. The hopper is preferably divided into a plurality of sector shaped compartments by the radial walls 17. From the compartments, the washing mixture flows through the pipes 18 secured to the respective arms 3. The discharge ends of the pipe are spaced at different distances from the shaft, so that the washing mixture is introduced into an annular zone, corresponding to the annular zone in which the bulk of the solids settle. The discharge ends of the pipes are preferably arranged immediately behind the plows 5, so that the washing mixture or liquid is introduced into the thick pulp as it is being turned over. The specific gravity of the wash is less than the specific gravity of the material in the tank and the hopper 16 is placed above the level of the solution in the tank, so that the wash will flow downward and discharge from the pipes 18.

The capacity of the pump 13 is such that a greater amount of pulp is recirculated than is originally flowed into the tank and the recirculated thick pulp is being constantly diluted, and continually replaces valuable solution in the settled pulp.

Assuming that 200 tons of pulp, consisting of 100 tons of solids and 100 tons of solution are flowed through the launders 7 in a day. The pump 13 is designed to lift 500 tons of solids and 500 tons of solution per day and the launders 14—15 are so proportioned that 100 tons of solids and 100 tons of solution are removed from the circuit through the launder 15 and 400 tons of solids and 400 tons of solution are discharged into the launder 14. The pipe 16 discharges 100 tons of wash solution into the launder 14, that is, an amount of wash solution equal to the liquid content of the pulp removed from the circuit. The clear solution in the tank flows into the launder 9 at the same rate as solution flows into the tank through the launders 7 that is, at the rate of 100 tons a day and this clear solution is returned to the system, and since it is equal in amount to the solution flowing into the tank from the system, an excess of solution is not accumulated in the system. By this method, substantially complete displacement will be made in fewer tanks than at present and less valuable solution will be lost. Also, by introducing the wash into the thick pulp adjacent to or at the point at which it is being turned over by the plows, washing liquid alone may be introduced without causing channeling, instead of employing a washing liquid mixed with thick pulp.

I claim:

1. The process of replacing solution in a pulp with other liquid which consists in allowing the pulp to settle to form a thick pulp at the bottom, drawing off the thick pulp from the bottom, adding washing liquid to a portion of the withdrawn thick pulp and flowing it back into the settled thick pulp.

2. The process of replacing solution in a pulp with other liquid which consists in allowing the pulp to settle to form a thick pulp at the bottom, and introducing a washing mixture into the settled thick pulp in such dilution that it is of substantially the same specific gravity as the settled thick pulp.

3. The process of replacing solution in a pulp with other liquid which consists in allowing the pulp to settle to form a thick pulp at the bottom, drawing off thick pulp from the bottom, removing a portion of the withdrawn pulp from the discharging stream, adding an amount of washing liquid to the remaining drawn off pulp equal in quantity to the liquid content of the removed portion of the pulp and flowing the remaining drawn off pulp and liquid back into the settled thick pulp.

4. The process of replacing solution in a pulp with another liquid which consists in continuously flowing the pulp into a tank wherein it settles to form a thick pulp at the bottom, withdrawing thick pulp from the bottom of the tank, and diluting a portion of the withdrawn pulp and flowing it back into the thick pulp in the tank.

5. The process of replacing solution in a pulp with another liquid which consists in continuously flowing the pulp into a tank wherein it settles to form a thick pulp at the bottom and clear solution at the top, permitting the clear solution to discharge from the tank at a rate equal to the liquid content of the pulp flowing into the tank, withdrawing thick pulp from the bottom of the tank, removing a portion of the withdrawn pulp from the discharging stream, adding washing liquid to the remaining withdrawn pulp equal in quantity to the liquid content of the removed portion of the pulp and flowing the remaining drawn off pulp and liquid back into the settled thick pulp.

6. The process of replacing solution in a pulp with another liquid which consists in flowing the pulp into a tank in which it settles to form a thick pulp at the bottom, continuously withdrawing thick pulp from the bottom of the tank and reintroducing it into the thick pulp and adding washing liquid to the thick pulp during the time that it is withdrawn from the tank.

7. The process of replacing solution in a pulp with another liquid which consists in flowing the pulp into a tank in which it settles to form a thick pulp at the bottom, moving the thick pulp toward an outlet in the bottom of the tank and introducing washing material of substantially the same specific gravity as the pulp into the thick pulp without violent agitation of the pulp.

8. The process of replacing solution in a pulp with another solution which consists in flowing the pulp into a tank in which it settles to form a thick pulp at the bottom, turning over and moving the thick pulp toward an outlet in the bottom and introducing washing liquid of substantially the same specific gravity as the settled thick pulp into the thick pulp without violent agitation of the pulp.

9. The process of replacing solution in a pulp with another liquid which consists in flowing the pulp into a tank in which it settles to form a thick pulp at the bottom, turning over and moving the thick pulp toward an outlet in the bottom of the tank, introducing washing liquid of substantially the same specific gravity as the settled thick pulp gently into the thick pulp in the zone in which it is being turned over whereby the washing liquid displaces the solution in the pulp and discharging the thick pulp so treated from the tank.

10. The process of replacing solution in a pulp with other liquid which consists in allowing the pulp to settle in a tank to form a thick pulp at the bottom, turning over and moving the settled pulp toward a discharge outlet, discharging the moved pulp from the tank, adding a washing liquid to a portion of said discharged pulp and introducing the diluted pulp into the tank in the zone in which the settled pulp is being turned over.

11. The process of replacing solution in a pulp with another liquid, which consists in flowing the pulp into a tank in which the bulk of the solids settle in a predetermined zone, moving the settled pulp from said zone to an outlet and introducing washing liquid of substantially the same specific gravity as the settled thick pulp into the zone as the settled pulp is being moved.

In testimony whereof, I have hereunto set my hand at San Francisco, California, this 3rd day of March, 1919.

LOUIS D. MILLS.

In presence of—
H. G. Prost.